(12) United States Patent
Binggeli et al.

(10) Patent No.: US 8,881,857 B2
(45) Date of Patent: Nov. 11, 2014

(54) BICYCLE FRAME FOR RECEIVING A BATTERY UNIT AND ASSOCIATED BATTERY UNIT

(75) Inventors: Thomas Binggeli, Niederscherli (CH); Dominic Isenschmid, Liebefeld (CH); Andreas Zbären, Herbligen (CH); Urs Graf, Bösingen (CH); Marcel Aeschlimann, Ligerz (CH); Christoph Rusch, Biel (CH); Gary Cooper, Meinisberg (CH)

(73) Assignee: Thomus Veloshop AG (CH)

( * ) Notice: Subject to any disclaimer, the term of this patent is extended or adjusted under 35 U.S.C. 154(b) by 709 days.

(21) Appl. No.: 12/727,596

(22) Filed: Mar. 19, 2010

(65) Prior Publication Data

US 2010/0237585 A1    Sep. 23, 2010

(30) Foreign Application Priority Data

Mar. 20, 2009  (EP) .................................. 09155797

(51) Int. Cl.
| | | |
|---|---|---|
| *B62M 6/90* | (2010.01) | |
| *B62M 6/40* | (2010.01) | |
| *B60R 16/04* | (2006.01) | |
| *B62K 19/30* | (2006.01) | |
| *B60K 1/04* | (2006.01) | |

(52) U.S. Cl.
CPC *B62M 6/90* (2013.01); *B60R 16/04* (2013.01); *B60K 1/04* (2013.01); *B60Y 2200/13* (2013.01); *B62K 19/30* (2013.01)
USPC ...................... 180/207.1; 180/206.1; 180/68.5

(58) Field of Classification Search
CPC .......... B62M 6/40; B62M 6/90; B62K 11/00; B60R 16/04

USPC ................ 180/206.1–207.1, 220, 207.3, 68.5
See application file for complete search history.

(56) References Cited

U.S. PATENT DOCUMENTS

| | | | | |
|---|---|---|---|---|
| 5,477,936 A | * | 12/1995 | Sugioka et al. | 180/68.5 |
| 5,798,702 A | * | 8/1998 | Okamoto et al. | 340/636.1 |
| 5,806,621 A | * | 9/1998 | Soda et al. | 180/206.4 |
| 6,285,160 B1 | * | 9/2001 | Tsai | 320/112 |
| 6,446,745 B1 | * | 9/2002 | Lee et al. | 180/206.2 |

(Continued)

FOREIGN PATENT DOCUMENTS

| | | |
|---|---|---|
| DE | 20 2008 009933 | 9/2008 |
| EP | 0 686 522 | 12/1995 |

(Continued)

OTHER PUBLICATIONS

European Search Report for European Application No. EP 09 15 5797 completed on Jul. 27, 2009.

*Primary Examiner* — Anne Marie Boehler
(74) *Attorney, Agent, or Firm* — Ostrolenk Faber LLP

(57) ABSTRACT

The invention relates to a bicycle frame comprising a tube section having an interior space for receiving at least one battery unit that is suitable as a source of energy for an electromotive bicycle drive, as well as to a battery unit insertable therein.

To provide an easy operation and at the same time a highly stabilized placement of the battery, it is suggested that said tube section is provided with a lateral opening substantially extending in the direction of extension of said tube section, wherein said battery unit is insertable into said interior space through said lateral opening.

13 Claims, 8 Drawing Sheets

(56) References Cited

U.S. PATENT DOCUMENTS

| | | |
|---|---|---|
| 6,623,023 B2 * | 9/2003 | Niitsu et al. .................. 280/278 |
| 7,934,576 B2 * | 5/2011 | Munksoe ...................... 180/220 |
| 2003/0051934 A1 * | 3/2003 | Ou ............................... 180/220 |
| 2003/0094324 A1 * | 5/2003 | Huang .......................... 180/220 |
| 2004/0163870 A1 * | 8/2004 | Liao et al. .................... 180/220 |
| 2005/0217910 A1 * | 10/2005 | Yonehana et al. ........... 180/68.5 |
| 2006/0000655 A1 * | 1/2006 | Schless ........................ 180/220 |

FOREIGN PATENT DOCUMENTS

| | | |
|---|---|---|
| EP | 0 905 014 B1 | 6/2004 |
| EP | 1 693 290 | 8/2006 |
| EP | 1 982 909 | 10/2008 |

* cited by examiner

BICYCLE FRAME FOR RECEIVING A BATTERY UNIT AND ASSOCIATED BATTERY UNIT

FIELD OF THE INVENTION

The present invention relates to a bicycle frame comprising a tube section having an interior space for receiving at least one battery unit that is suitable as a source of energy for an electromotive bicycle drive. The invention further relates to a battery unit for insertion into such a bicycle frame.

BACKGROUND OF THE INVENTION

Electric motors are used in bicycles both as a full drive and as an auxiliary or hybrid drive, the electric motor, when required, acting either as a complete bicycle drive or to assist the pedal drive actuated by the cyclist. As sources of energy for such a motor, batteries, more particularly rechargeable batteries are required, which are conventionally fastened to the bicycle frame in a suitable location. To this end, the bicycle frame is usually provided with a battery container. However, such a battery container is relatively bulky and not only reduces the free space otherwise available on the bicycle frame, particularly for accommodating additional equipment such as water bottles, bicycle tools, etc., but may even impair the cycling comfort for the cyclist in the extreme case. In addition, securing the battery inside such a container also represents a problem since it has a significant own weight but occasionally has to withstand hard shocks during cycling.

EP 0 905 014 B1 discloses a motor-driven folding bicycle in the rear frame section of which a battery for its electric drive is stored. When the front frame section is folded around the rear frame section, a frontal opening on the front side of the rear frame section is uncovered through which the battery compartment is accessible from the outside. However, such a frontal opening is only convenient in folding bicycles since the front side of a non-folding bicycle is normally covered by the bicycle lights, the brake lines, etc., and is only insufficiently accessible. Furthermore, the possibility of securing the battery in the frame interior is also limited by this frontal opening. For a reliable battery retention that is also protected against hard shocks of the frame a force application to the battery in the longitudinal direction of the frame would be necessary. However, since the frontal frame opening requires a manual insertion of the battery against the action of such a force, only relatively small retaining forces may be employable in such a battery holder.

SUMMARY OF THE INVENTION

It is therefore an object of the present invention to provide a bicycle frame of the kind mentioned in the introduction that allows a simple insertion and removal of a battery unit into and from the interior of the frame tube while avoiding the foregoing disadvantages, and that simultaneously ensures a reliable and safely protected accommodation of the battery.

This is accomplished by a bicycle frame wherein the tube section of the bicycle frame has a lateral opening substantially extending in the direction of the extension of said tube section, wherein said battery unit is insertable into said interior space through said lateral opening. In this manner, a simple insertion and removal of the battery into and from the interior is possible transversally to the frame. At the same time, such an inserting mechanism allows the arrangement of a highly stable battery fixture over the corresponding tube length of the interior. The dependent claims indicate preferred embodiments of this bicycle frame and of a battery unit insertable therein.

A particularly comfortable insertion and removal of the battery unit can be achieved through a swinging arrangement that provides a guidance of the manual operation and allows a precise positioning of the battery. Preferably, a hinge is arranged at one end of the interior space to which the battery unit can be coupled and swung around toward the interior space after the coupling operation. Nearby this hinge, an electric contact for the battery unit is preferably arranged such that the contact with the electromotive drive is already established when it is coupled to the hinge. In a further preferred manner, a closure lid for the lateral opening is hinged to the hinge. This offers the advantage that on one hand, the closure lid may serve to determine an inserting direction of the battery for coupling it to said hinge, and on the other hand, that a simultaneous closure of the lateral opening can be achieved during the insertion of the battery unit in the course of the swinging movement performed.

To achieve a safe battery fixture, according to a preferred embodiment, it is suggested that a tensioning device is arranged in the interior space, the tensioning device allowing an application of a tension force to the battery unit in the direction of extension of the tube section. In a further preferred embodiment in which according to the foregoing explanations a hinge is arranged at one end of the interior space, the tensioning device is arranged at the end of the interior space opposite the hinge. The tension force produced by the tensioning device is preferably equal to at least 100 N, preferably about 150 N, and may e.g. be created by the arrangement of at least one spring that is preferably pretensioned during the operation of inserting the battery unit already, and/or by a rotatably mounted axle by which the tension force may e.g. be applied to the battery unit after its insertion.

According to a first preferred embodiment of the tensioning device, the latter comprises at least one pivot arm capable of pivoting between an outer position in which the pivot arm is directed toward the lateral opening, and an inner position in which the pivot arm is brought nearer to the direction of extension of the tube section, the pivot arm being fixable to the battery unit during the insertion of the latter. In this case, a spring for producing the tension force may be coupled to the pivot arm and may e.g. be partly integrated in its interior.

According to a second embodiment, the tensioning device comprises a guide roller along which the battery unit is guided during its insertion into the interior space. In this case, the guide roller may be coupled to a spring for creating the tension force.

According to a third embodiment, the tensioning device comprises a rotatably mounted axle by which, as already explained above, the tension force can be applied to the battery unit after its insertion.

A battery unit for insertion into such a bicycle frame is preferably provided on its rear side with a connecting section designed for coupling the same to the aforementioned hinge. On its front side, a battery unit according to the invention is preferably provided with a projecting or recessed structure for coupling it to the aforementioned tensioning device. In this manner, e.g. a coupling to the aforementioned pivot arm or a snap engagement on the aforementioned guide roller may be achieved.

BRIEF DESCRIPTION OF THE DRAWINGS

The invention will be explained in more detail hereinafter by means of preferred embodiments and with reference to the drawings from which further features and advantages of the invention will become apparent. The figures show.

DETAILED DESCRIPTION OF THE PREFERRED EMBODIMENTS

Figure 1:
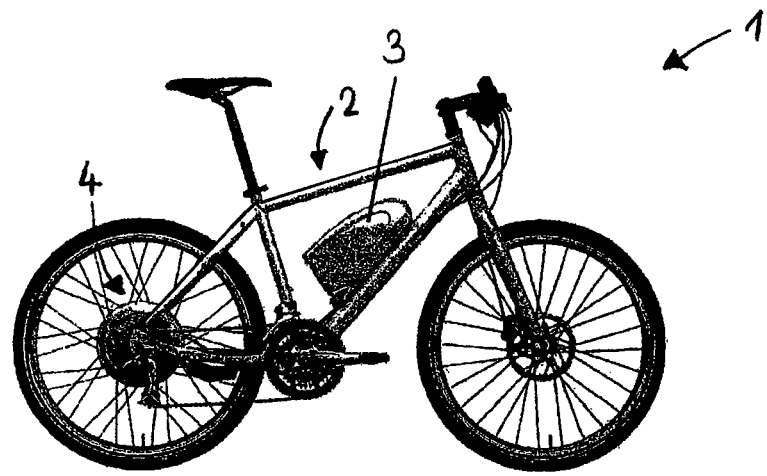
FIG. 1: a lateral view of a conventional battery-operated bicycle.

In FIG. 1, an electromotively driven bicycle 1 of the prior art is shown with a bicycle frame 2 on the down tube of which a battery enclosure 3 for receiving a battery unit is mounted, the latter supplying the energy for an electric motor 4 arranged on the rear wheel. Such a known electric motor 4 may be used both as a full bicycle drive and as a hybrid drive where the cyclist's muscular force is assisted depending on the drive force transmitted to the rear wheel by the pedal drive.

Figure 2:
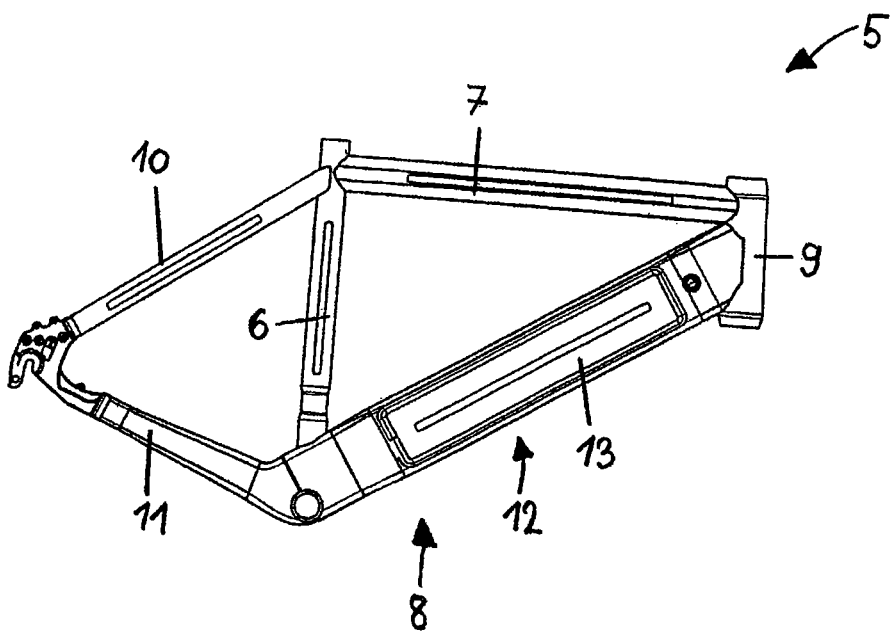
FIG. 2: a lateral view of a bicycle frame of the invention comprising a tube section for receiving a battery unit.

FIG. 2 shows a bicycle frame 5 of the invention. The frame is essentially composed of a seat tube 6, a top tube 7 and a down tube 8 arranged in a triangular shape, as well as of a head tube 9 on the front side and two seat stays 10 and two chain stays 11 arranged on the frame on the rear side thereof. As compared to seat tube 6 and top tube 7, down tube 8 has a cross-sectional shape that is extended in the plane of the frame, thereby creating an enlarged tube cross-section. In tube mid-section 12 of down tube 8, a closure lid 13 for a lateral opening 14 is arranged that is shown in more detail in FIG. 4.

Figure 3:
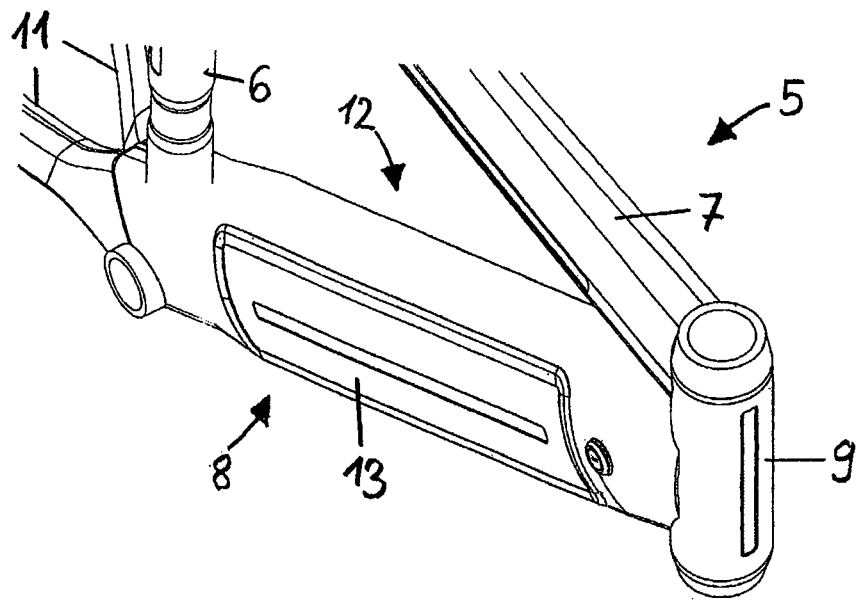
FIG. 3: an enlarged perspective view of the tube section shown in FIG. 2 for receiving a battery unit with the closed closure lid.

FIG. 3 shows a detail of bicycle frame 5 in an enlarged view again illustrating down tube 8 with the closed closure lid 13.

Figure 4:
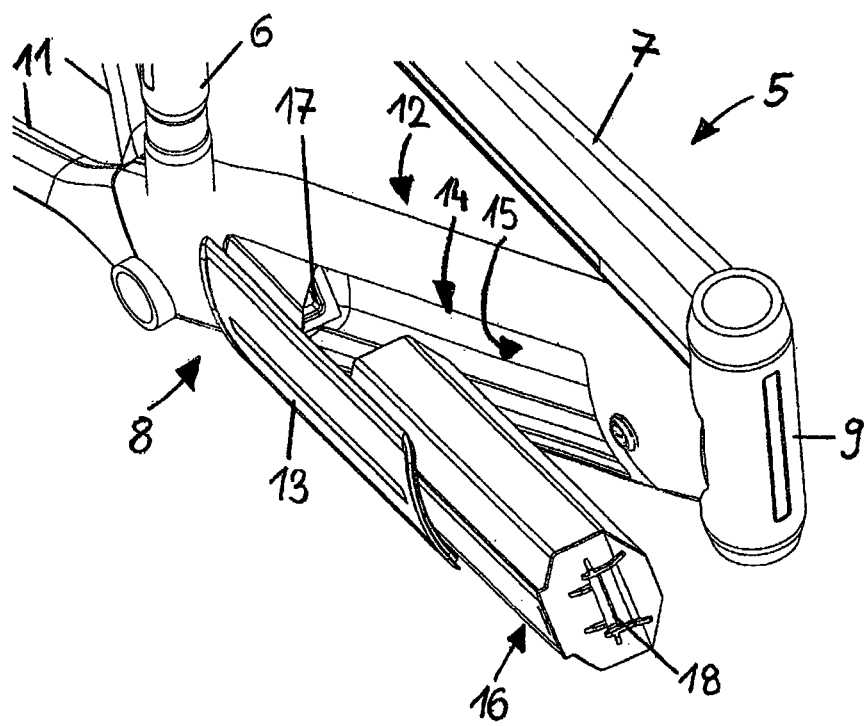
FIG. 4: a perspective view of the tube section shown in FIG. 3 with the open closure lid.

FIG. 4 shows the same detail with the open closure lid 13 whereby interior space 15 of tube mid-section 12 is accessible from the outside through lateral opening 14. Lateral opening 14 extends in the longitudinal direction of tube section 12 and over a substantial portion of the interior space 15.

Furthermore, in FIG. 4, a battery unit 16 for insertion into interior space 15 is shown. Battery unit 16 is essentially cylindrical in shape with an octagonal cross-section. The shape of the area of interior space 15 located behind lateral opening 14 is adapted to the external contour of battery unit 16. At its rear end, closure lid 13 is rigidly connected to a connecting socket 17 that projects into interior space 15 and into which battery unit 16 is pluggable by its rear side. Along closure lid 13, battery unit 16 can be manually guided toward its correct connecting position in connecting socket 17.

Connecting socket 17 is hinged at the rear end of interior space 15, as explained in more detail hereinafter, thereby allowing to swing around closure lid 13 with plugged in battery unit 16 transversally to lateral opening 14. On the front end of battery unit 16, several projecting structures 18 are formed by which battery unit 16 is adapted to engage in a tensioning device 20, as will be explained in more detail with reference to the following figures also.

Figure 5A:
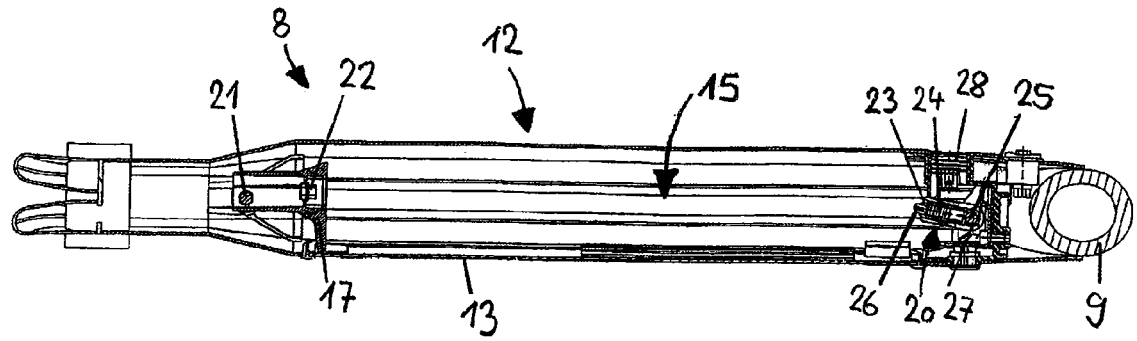
FIGS. 5(a)-(h): respective sectional views of the tube section according to FIGS. 3 and 4 in which a tensioning device according to a first embodiment of the invention is integrated, the views illustrating respective steps for inserting a battery unit into the interior space of the tube.

FIG. 5(a) shows down tube 8 in a sectional view. The Figure shows a hinge 21 arranged at the rear end of interior space 15, to which connecting socket 17 is hinged along with closure lid 13 fastened thereto. Furthermore, connecting socket 17 is provided with an electric contact 22 for battery unit 16 that is pluggable therein.

At the frontal end of interior space 15, tensioning device 20 for tensioning battery unit 16 in the direction of the bicycle frame 5 is arranged. Tensioning device 20 comprises a pivot arm 23 in the interior of which a spring 24 for producing the tension force is arranged. In an inner position, pivot arm 23 is located near the down tube axis and is hinged to a tensioning axle 25 so as to be able to pivot between its inner position and an outer position in which it is directed toward lateral opening 14, this pivoting movement taking place in the same pivoting plane as that of connecting socket 17. At the outer end of pivot arm 23, a rounded taper 26 is formed that serves for its engagement in the correspondingly shaped raised structure 18 on battery unit 16 in order to achieve a coupling of battery unit 16 to tensioning device 20 during the inserting operation.

A coil spring 27 is wound around tensioning axle 25. On the outer wall of tube section 12 opposite lateral opening 14, a push button 28 with an attached return spring is arranged that is operatively connected to pivot arm 23.

Hereinafter, the consecutive steps for inserting battery unit 16 into interior space 15 are explained in more detail with reference to FIGS. 5(b)-5(h).

Figure 5B:
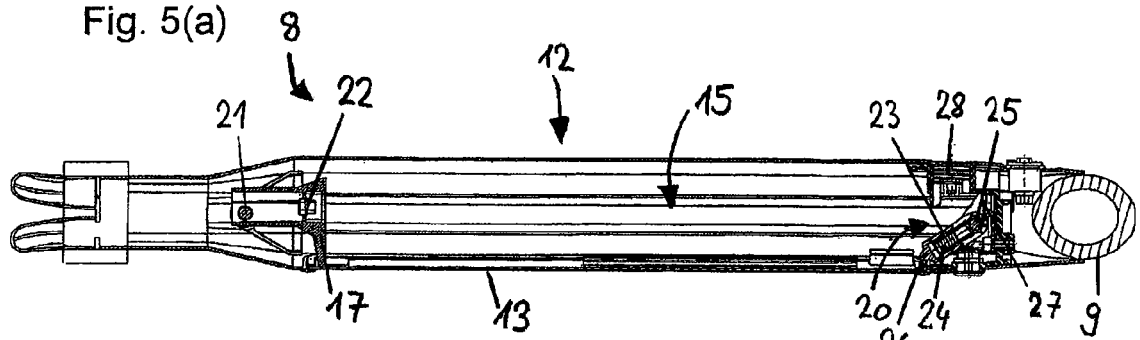

FIG. 5(b) shows down tube 8 after the actuation of push button 28. Coil spring 27 is thus released, thereby producing a rotation of tensioning axle 25 and a resulting pivoting movement of pivot arm 23 from its inner position to its outer position. At the same time, the locking mechanism of closure lid 13 is unlocked so that the latter may be opened manually.

Figure 5C:
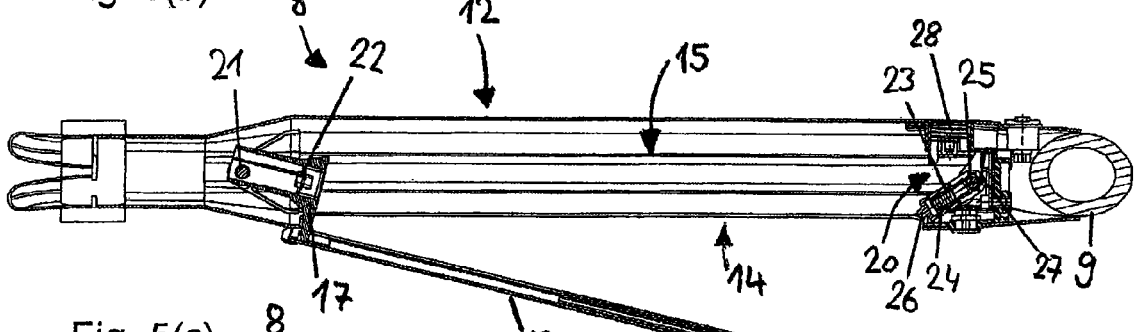

FIG. 5(c) shows down tube 8 after opening closure lid 13 around hinge 21.

Figure 5D:
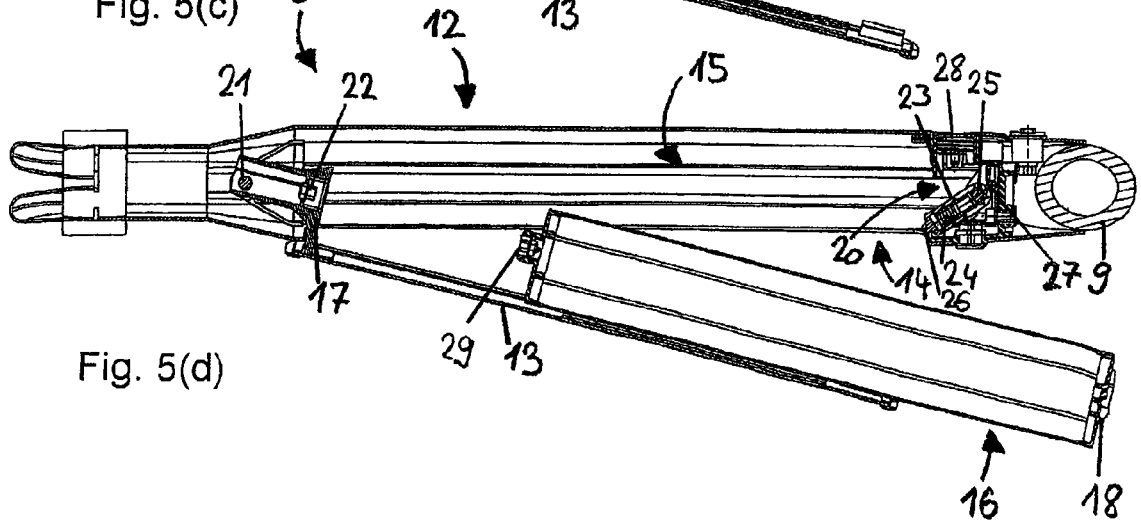

FIG. 5(d) shows battery unit 16 that is being guided toward connecting socket 17 along the inner side of opened closure lid 13. Here, especially the rearward connecting section 29 of battery unit 16 that is to be introduced into connecting socket 17 is visible, which forms an electric contact.

Figure 5E:
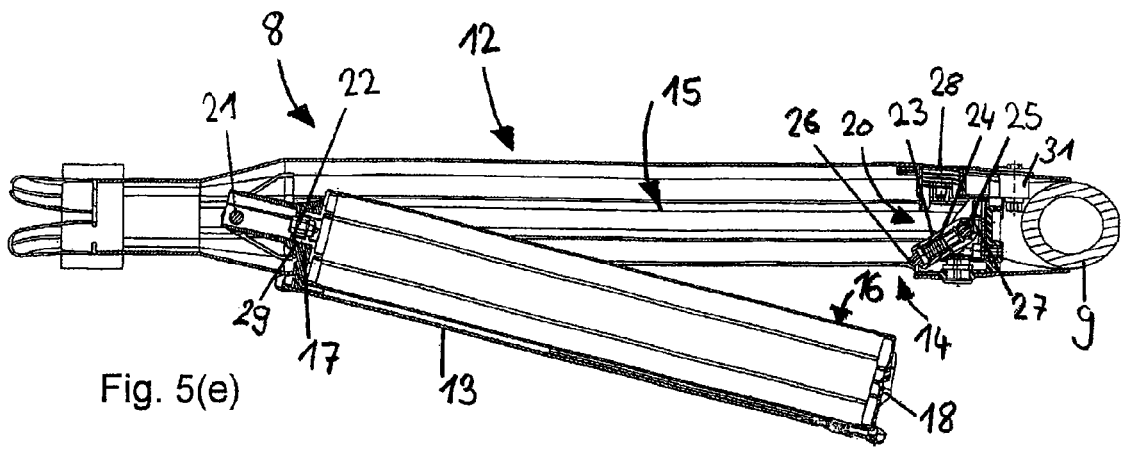

FIG. 5(e) shows battery unit 16 after the introduction of connecting section 29 into connecting socket 17, whereby the battery is already electrically connected on this side.

Figure 5F:
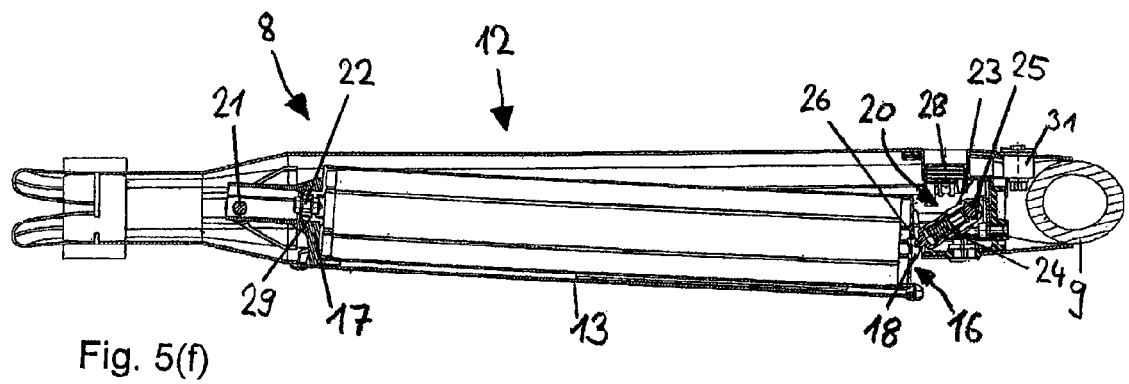

FIG. 5(f) shows battery unit 16 after swinging back closure lid 13, whereby battery unit 16 is guided toward lateral opening 14 along its longitudinal side until its frontal raised structure 18 abuts to pivot arm 23 and enters into engagement with taper 26 at the end thereof.

Figure 5G:
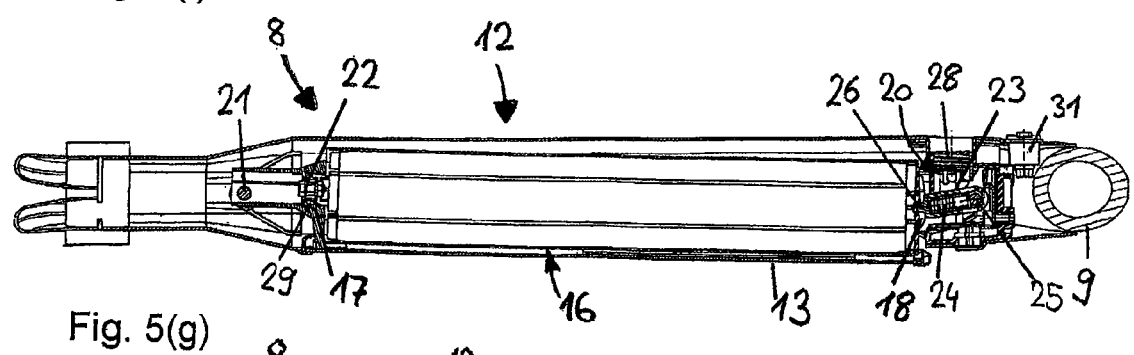

FIG. 5(g) shows battery unit 16 after further swinging back closure lid 13 while pivot arm 23 engaged on the battery unit is carried along. In this manner, an increasing tension of spring 24 and an accompanying force application to battery unit 16 are created.

Figure 5H:
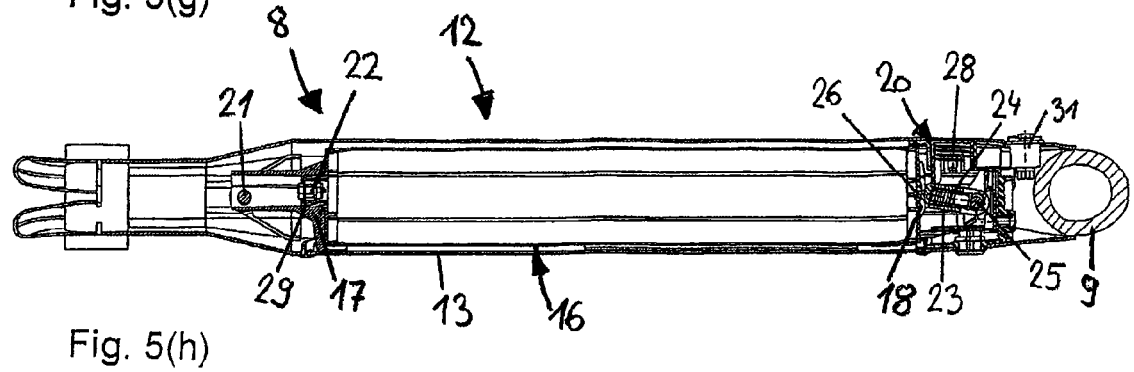

FIG. 5(h) shows battery unit 16 after its complete insertion into interior space 15 with closure lid 13 locked. Pivot arm 23 is now completely brought back to its inner position, whereby a maximum spring tension and force application to battery unit 16 is achieved. By such a tensioning device 20, a high tension force can be transmitted to battery unit 16, whereby a high horizontal stability is achieved.

To remove battery unit 16 from interior space 15, push button 28 has to be actuated, thereby causing closure lid 13 to be unlocked so that closure lid 13 can be swung out. In spite of the relatively high tension force, the manual releasing force required therefore is very small.

Figure 6A:
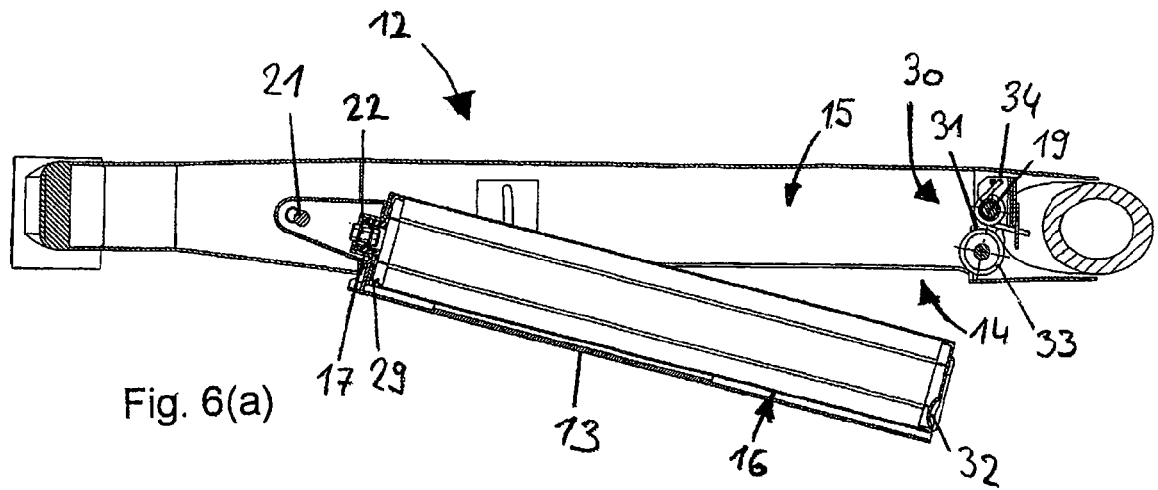
FIGS. 6(a)-(c): respective sectional views of a tube section in which a tensioning device according to a second embodiment of the invention is integrated, the views illustrating respective steps for inserting a battery unit into the interior space of the tube.

FIG. 6(a) shows a tube section 12 with a tensioning device 30 according to a second embodiment of the invention. Tensioning device 30 comprises a guide roller 33 that is coupled by a pivot arm 31 to a coil spring 34 arranged nearer to the rear wall side. On its other side, coil spring 34 is rigidly connected to tube section 12. Pivot arm 31 is hinged to an axle 19 arranged in coil spring 34 such that a movement component of guide roller 33 in the direction of extension of tube section 12 is ensured. Further illustrated is battery unit 16 that is already plugged into connecting socket 17. On the front side of battery unit 16, a circular recess 32 is formed whose shape corresponds to a segment of the circumference of guide roller 33, thereby allowing a snap engagement.

Figure 6B:
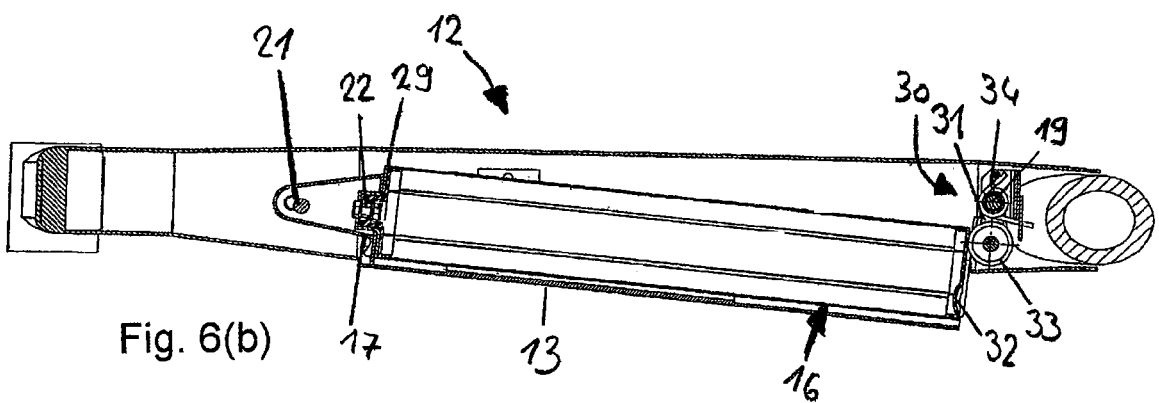

FIG. 6(b) shows battery unit 16 after swinging closure lid 13 around until the front side of battery unit 16 enters into contact with guide roller 33. As battery unit 16 is further introduced, guide roller 33 is set into rotation and coil spring 34 is tensioned, thereby achieving an increasing force application to guide roller 33 in the direction of battery unit 16.

Figure 6C:
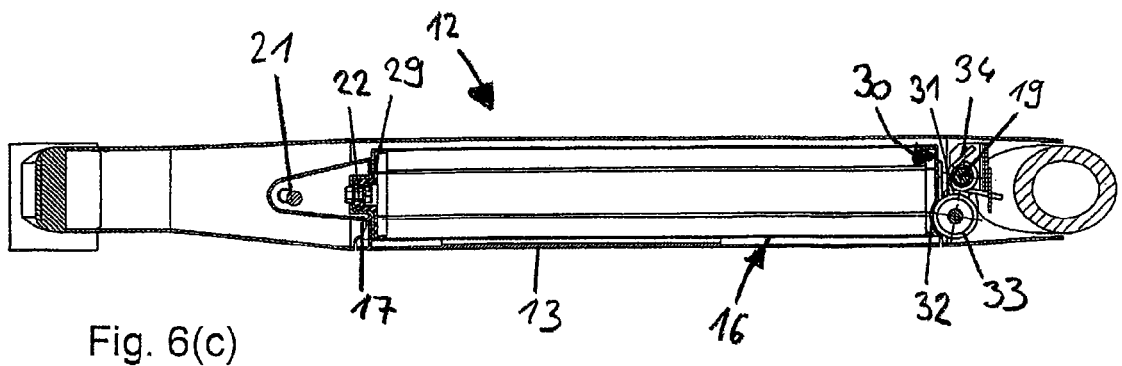

FIG. 6(c) shows battery unit 16 after its complete insertion into interior space 15 of tube section 12. Guide roller 33 is engaged in recess 32 and closure lid 13 is closed.

Figure 7A:
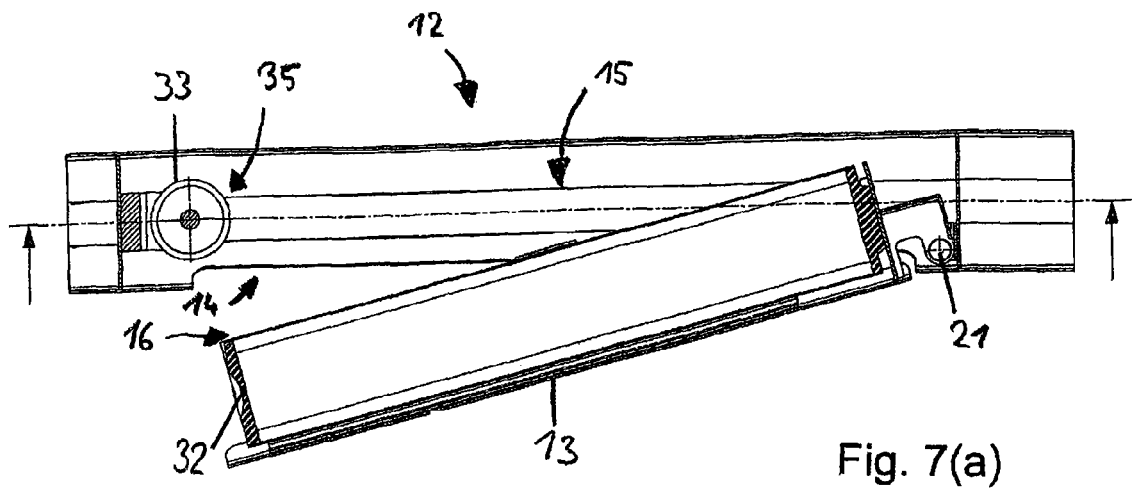
FIGS. 7(a)-(d): respective sectional views of a tube section in which a tensioning device according to a third embodiment of the invention is integrated, FIG. 7(b) illustrating a section according to the sectional plane indicated in FIG. 7(a), and FIGS. 7(a), 7(c), and 7(d) illustrating respective steps for inserting a battery unit into the interior space of the tube section according to the same sectional view.

FIG. 7(a) shows a tube section 12 with a tensioning device 35 according to a third embodiment of the invention. Tensioning device 35 comprises a guide roller 33. Furthermore, battery unit 17 plugged into connecting socket 16 is illustrated again.

Figure 7B:
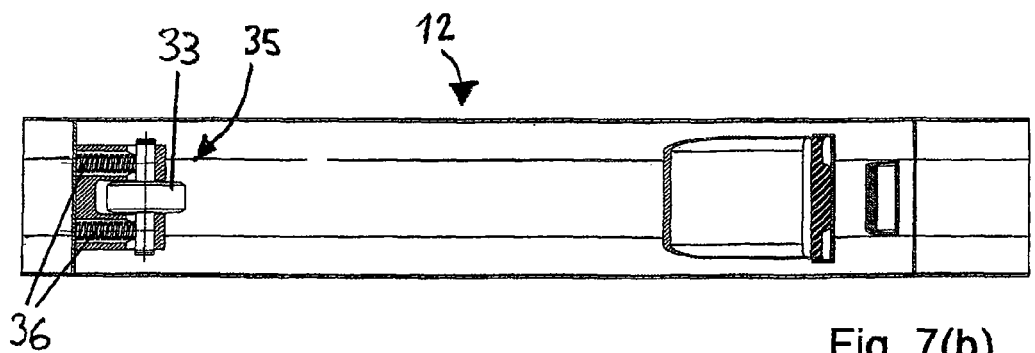

FIG. 7(b) shows tube section 12 illustrated in FIG. 7(a) in a sectional view according to the sectional plane indicated in FIG. 7(a). In this Figure it is seen that tensioning device 35 is associated to a spring pair 36 arranged at the end of interior space 15.

Figure 7C:
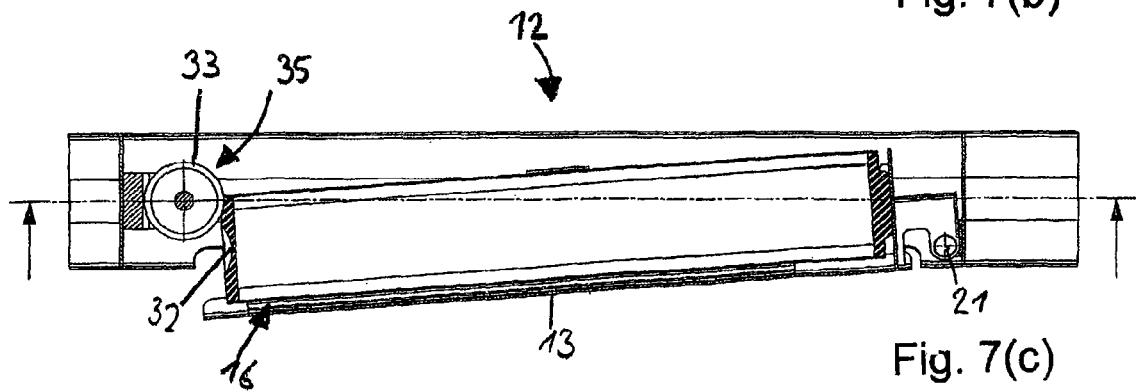
Figure 7D:
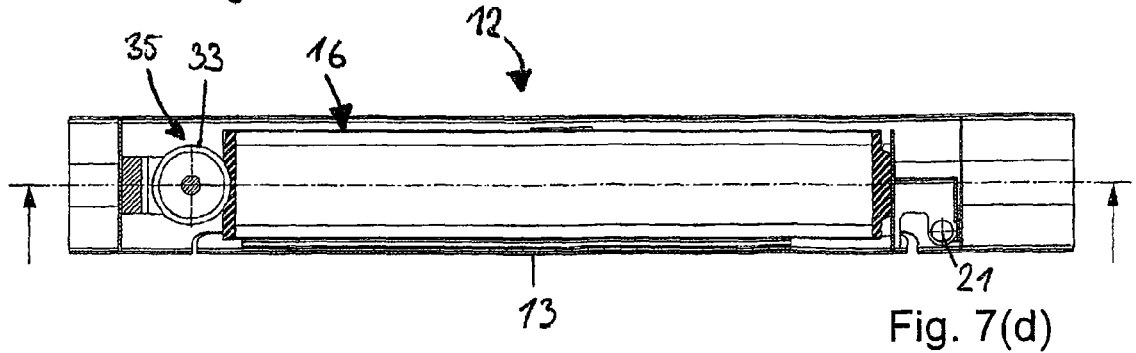

FIG. 7(c) shows tube section 12 according to the view of FIG. 7(a) with the front side of battery unit 16 brought into contact with guide roller 33. Here also, a further swinging movement of closure lid 13 results in an increasing force application to battery unit 16 until its circular recess engages in guide roller 33, as shown in FIG. 7(d).

Figure 8A:
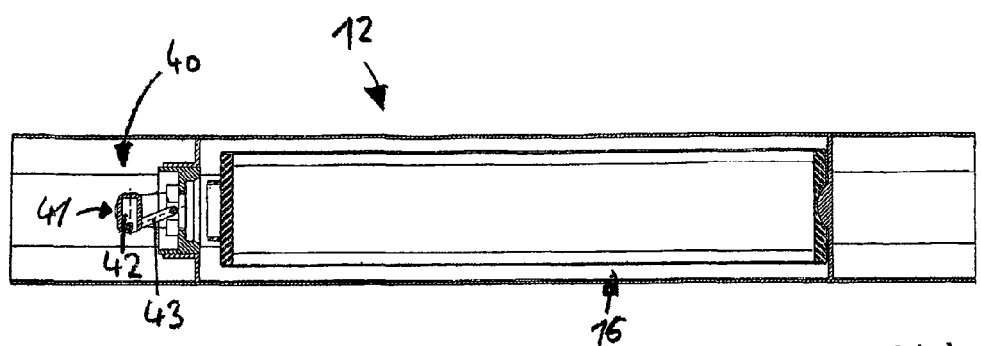
FIGS. 8(a),(b): respective sectional views of a tube section in which a tensioning device according to a fourth embodiment of the invention is integrated, FIG. 8(a) showing the tensioning device in the tensioned state and FIG. 8(b) showing the tensioning device in the untensioned state.

FIG. 8(a) shows a tube section 12 with a tensioning device 40 according to a fourth embodiment of the invention. Tensioning device 40 comprises a rotatably mounted axle 41 that is manually actuatable from the outside. Axle 41 has a twisting bolt 42 hinged thereto, and to the opposite side of the latter, a locking pin 43 is hinged. Further illustrated is battery unit 16 that is already inserted in interior space 15. Tensioning device 40 is in the untensioned state.

Figure 8B:
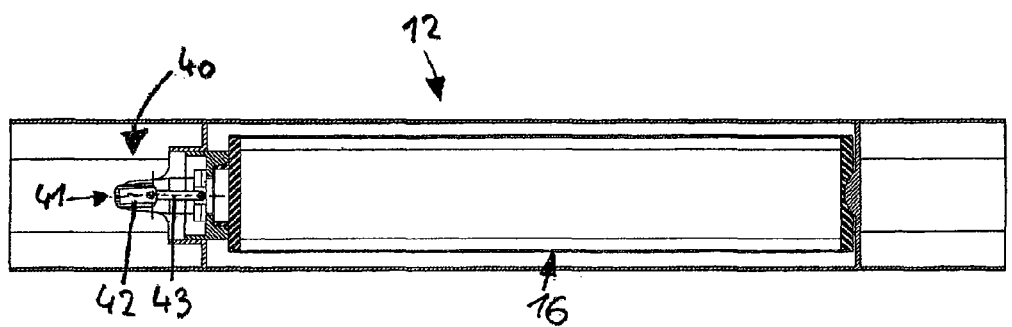

FIG. 8(b) shows tube section 12 after a rotation of axle 41 whereby the twisting bolt is moved toward the battery unit and the locking pin abuts to the front side of battery unit 16 such that an increasing tension force is applied to battery unit 16 as axle 41 is further rotated.

Figure 9A:
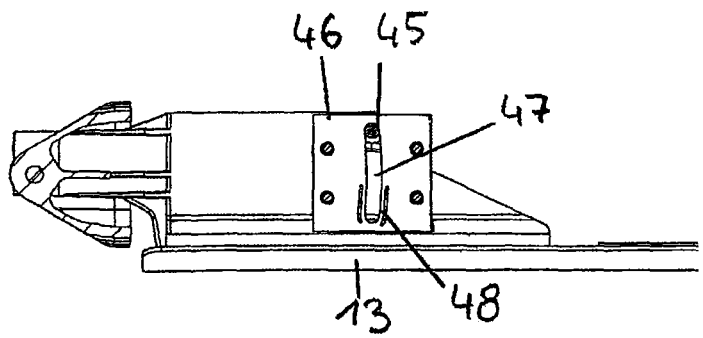
FIGS. 9(a),(b): a top view of a portion of a closure lid of the invention and a guide plate for the guidance thereof.
Figure 9B:
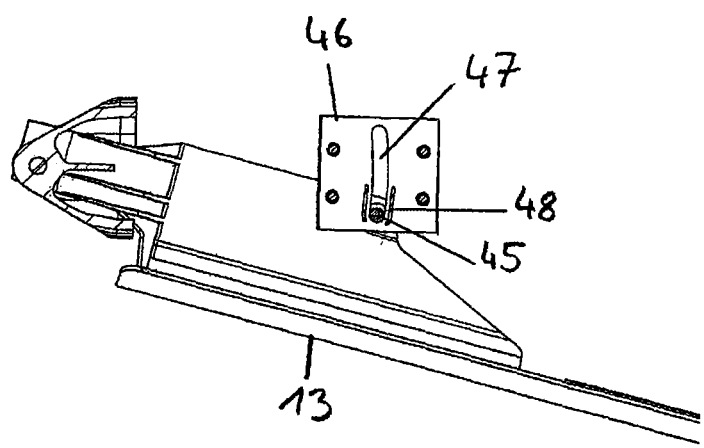

FIGS. 9(a) and 9(b) show closure lid 13 in a top view with a guide pin 45 fastened thereto. The guide pin engages in rail 47 of a guide plate 46 that is fastened to a tube section 12. In the outer end area of rail 47, a detent structure 48 is formed by which closure lid 13 is locked in its outer end position.

From the preceding description, modifications of the bicycle frame of the invention are apparent to one skilled in the art without departing from the scope of protection of the invention that is solely defined by the patent claims. Thus, inter alia:

instead of down tube 8, tube section 12 with interior space 15 for receiving at least one battery unit 16 may e.g. also be formed by top tube 7 or seat tube 6 of the bicycle frame geometry and may either extend over the entire tube length or only over a portion of the respective frame tube.

Besides the shown exemplary embodiments using one respective tensioning device 20, 30, 35, 40, it is also possible to use a combination of such tensioning devices, e.g. through the combination of a spring tension and of a force application by means of a rotatably mounted axle in order to achieve a desired tensioning action.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A bicycle frame comprising a plurality of tubes, one of said tubes comprising a tube section having an interior space for receiving at least one battery unit that is suitable as a source of energy for an electromotive bicycle drive, wherein said tube section is provided with a lateral opening substantially extending in the direction of extension of said tube section, wherein said battery unit is insertable into said interior space through said lateral opening, wherein said tube in which said tube section is provided has an enlarged tube cross section as compared to another tube of said bicycle frame to provide said interior space and wherein a tensioning device is arranged in said interior space, said tensioning device allowing an application of a tension force to said battery unit in the direction of extension of said tube section; and said tensioning device comprises a guide roller along which said battery unit is guided during its insertion into said interior space.

2. The bicycle frame of claim 1, comprising at least one spring for producing said tension force, wherein said guide roller is coupled to said spring.

3. The bicycle frame of claim 1, wherein at one end of said interior space, a hinge is arranged to which said battery unit can be coupled and swung toward said interior space after said coupling, wherein said tensioning device is arranged at the end of said interior space opposite said hinge.

4. The bicycle frame of claim 1, wherein said tension force is equal to at least 100 N.

5. A bicycle frame comprising a plurality of tubes, one of said tubes comprising a tube section having an interior space for receiving at least one battery unit that is suitable as a source of energy for an electromotive bicycle drive, wherein said tube section is provided with a lateral opening substantially extending in the direction of extension of said tube section, wherein said battery unit is insertable into said interior space through said lateral opening, wherein said tube in which said tube section is provided has an enlarged tube cross section as compared to another tube of said bicycle frame to provide said interior space and wherein a tensioning device is arranged in said interior space, said tensioning device allowing an application of a tension force to said battery unit in the direction of extension of said tube section; and said tensioning device comprises a rotatably mounted axle that allows applying said tension force to said battery unit after its insertion.

6. The bicycle frame of claim 1, comprising at least one spring for producing said tension force.

7. The bicycle frame of claim 1, wherein said tension force is at least 150 N.

8. The bicycle frame of claim 5, wherein at one end of said interior space, a hinge is arranged to which said battery unit can be coupled and swung toward said interior space after said coupling, wherein said tensioning device is arranged at the end of said interior space opposite said hinge.

9. A bicycle frame comprising a plurality of tubes, one of said tubes comprising a tube section having an interior space for receiving at least one battery unit that is suitable as a source of energy for an electromotive bicycle drive, wherein said tube section is provided with a lateral opening substantially extending in the direction of extension of said tube section, wherein said battery unit is insertable into said interior space through said lateral opening, wherein said tube in which said tube section is provided has an enlarged tube cross section as compared to another tube of said bicycle frame to provide said interior space and wherein a connecting section for coupling said battery to a hinge is arranged on a rear side of said battery, said hinge being arranged at one end of said interior space.

10. The bicycle frame of claim 9, wherein an electric contact for said battery unit is arranged nearby said hinge.

11. The bicycle frame of claim 9, comprising a closure lid for said lateral opening that is hinged to said hinge.

12. The bicycle frame of claim 9, wherein a projecting or recessed structure for locking said battery to a tensioning device that is arranged in said interior space is formed on a front side of said battery.

13. The bicycle frame of claim 12, wherein said projecting or recessed structure is for locking to a pivot arm of said tensioning device or a guide roller of said tensioning device.

* * * * *